United States Patent
Doddakula et al.

(10) Patent No.: US 8,944,227 B2
(45) Date of Patent: Feb. 3, 2015

(54) END HORNS FOR PANTOGRAPH ASSEMBLY

(75) Inventors: Vamsi K. Doddakula, Dunlap, IL (US);
Eric J. Ruth, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 190 days.

(21) Appl. No.: 13/287,392

(22) Filed: Nov. 2, 2011

(65) Prior Publication Data

US 2013/0105263 A1  May 2, 2013

(51) Int. Cl.
*B60L 5/08* (2006.01)
*B60L 5/36* (2006.01)

(52) U.S. Cl.
CPC .... *B60L 5/08* (2013.01); *B60L 5/36* (2013.01)
USPC ........................................................ 191/59.1

(58) Field of Classification Search
CPC .................................. B60L 5/20; B60L 5/205
USPC ........ 191/50, 54, 55, 59, 59.1, 60, 60.1, 60.2, 191/60.3, 60.4
See application file for complete search history.

(56) References Cited

U.S. PATENT DOCUMENTS

| | | | |
|---|---|---|---|
| 3,830,990 A * | 8/1974 | Gray | 191/55 |
| 4,034,832 A | 7/1977 | Lewis | |
| 5,244,065 A | 9/1993 | Bartels et al. | |
| 5,531,301 A * | 7/1996 | Makino et al. | 191/55 |
| 6,591,953 B2 * | 7/2003 | Blanvillain | 191/60.2 |

FOREIGN PATENT DOCUMENTS

| | | | |
|---|---|---|---|
| DE | 735 012 | * | 4/1943 |
| JP | 55128104 A | | 10/1980 |
| JP | 3372713 | | 11/2002 |

* cited by examiner

*Primary Examiner* — Mark Le
(74) *Attorney, Agent, or Firm* — Miller, Matthias & Hull

(57) ABSTRACT

A pantograph assembly configured to transfer electrical power from an overhead conductor to a machine. The pantograph assembly includes a pantograph support detachably connected to the machine, an articulated assembly, a pan rail and a carbon brush. The pantograph support includes a first link, and a second link hingedly connected to the first link. The first link is connected to the pantograph support. The pan rail is supported by the second link of the articulated assembly. The carbon brush is supported by the pan rail along a longitudinal axis of the pan rail. The pantograph assembly further includes an end horn having a bridge portion connected to the carbon brush. The bridge portion is configured to transfer the overhead conductor between the end horn and the carbon brush.

20 Claims, 4 Drawing Sheets

END HORNS FOR PANTOGRAPH ASSEMBLY

TECHNICAL FIELD

The present disclosure relates to trolley-assist machines, and more particularly to end horns for a pantograph assembly for trolley-assist machines.

BACKGROUND

Machines such as trolley-assist machines or electric locomotives generally employ a pantograph assembly to provide electrical power to the machine. Typically, the pantograph assembly is carried on a top surface of the machine. The pantograph assembly is configured to draw power from an overhead conductor and transfer it to the machine. Typically, the pantograph assembly includes a carbon brush and an end horn associated with the carbon brush. During normal operation, the overhead conductor is in contact with the conducting carbon brush. However, in case the machine may have a lateral movement, due to a transition of the overhead conductor between the conducting carbon brush and the non-conducting end horn arcing may occur. This results in pitting and damage to the carbon brush.

Japanese Patent Number JP 55128104 (104 patent) discloses a pantograph having a horn formed by bending a pipe made of a light alloy into a shape of a circle with a suitable radius. The section of the horn is circular at a first joint with a bow part, and is ellipsoidal at a second joint. On the surface of the horn, resistance wires are wound in a combination or resistors are fixed thereby to form a sliding resistor to detect a position of a contact point with an overhead conductor. However, the '104 patent does not address the situation where arcing may occur between the overhead conductor and the carbon brush.

SUMMARY OF THE DISCLOSURE

In one aspect, the present disclosure provides a pantograph assembly configured to transfer electrical power from an overhead conductor to a machine. The pantograph assembly includes a pantograph support detachably connected to the machine, an articulated assembly, a pan rail, and a carbon brush. The pantograph support includes a first link, and a second link hingedly connected to the first link. The first link is connected to the pantograph support. The pan rail is supported by the second link of the articulated assembly. The carbon brush is supported by the pan rail along a longitudinal axis of the pan rail. The pantograph assembly further includes an end horn having a bridge portion connected to the carbon brush. The bridge portion is configured to transfer the overhead conductor between the end horn and the carbon brush.

Other features and aspects of this disclosure will be apparent from the following description and the accompanying drawings.

DETAILED DESCRIPTION

Figure 1:
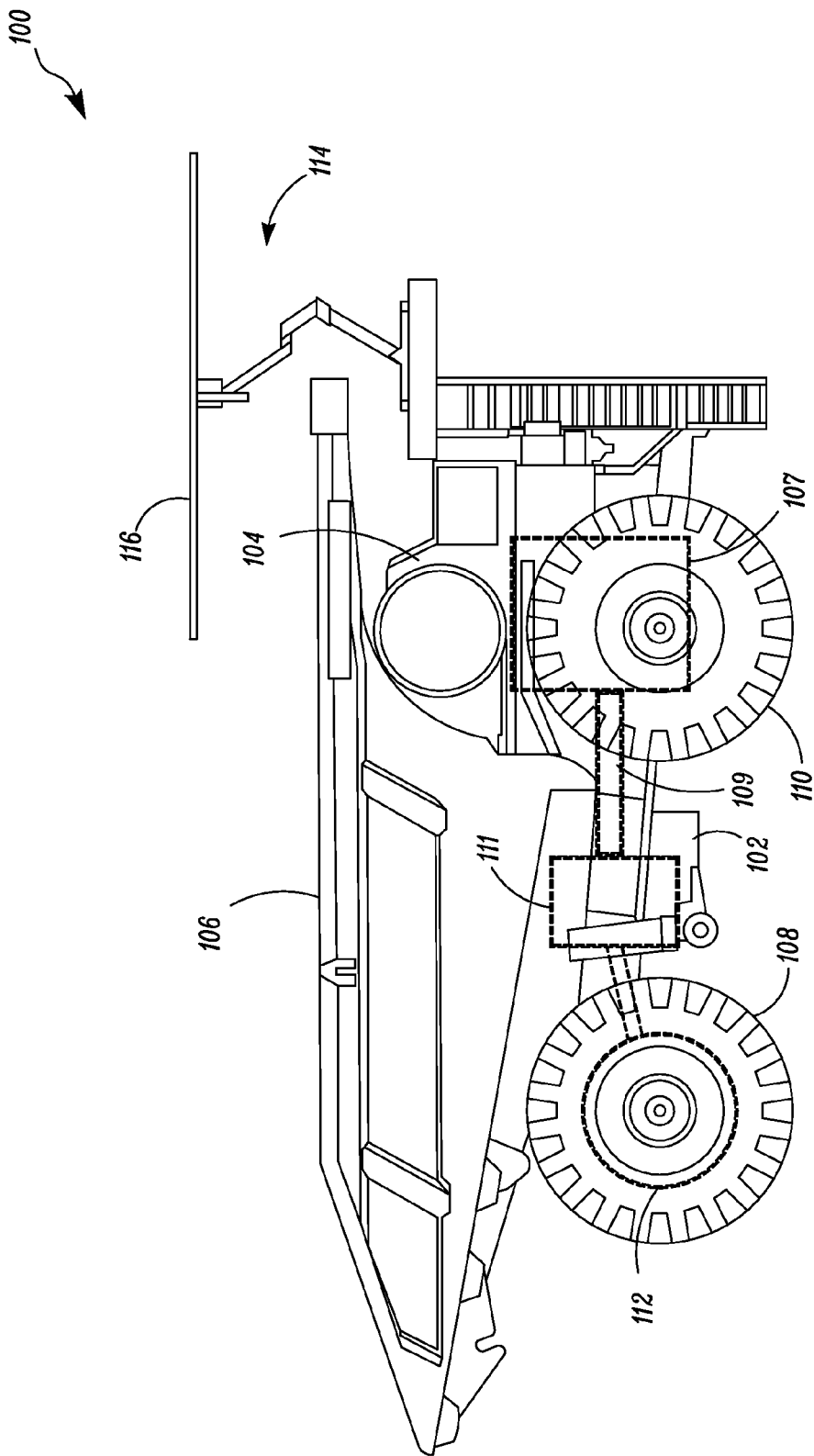
FIG. 1 is side view of a machine, according to an aspect of the present disclosure.

FIG. 1 illustrates a side view of a machine 100, according to an aspect of the present disclosure. The machine 100 may include a vehicle such as an off-highway truck, or other vehicle used in mining, construction, quarrying, and other applications. One example of the machine 100 is the off-highway truck including a chassis 102 that supports an operator cab 104 and a bucket 106. The bucket 106 may be connected to the chassis 102 and arranged to carry a payload. The machine 100 may include a power source 107, for example, but not limited to, an engine (internal combustion, gas, diesel, gaseous fuel, natural gas, propane, etc.), may be of any size, with any number of cylinders, and in any configuration ("V," in-line, radial, etc.). The chassis 102 also supports various other drive system components. These drive system components are capable of driving a set of drive wheels 108 to propel the machine 100. A set of idle wheels 110 can steer such that the machine 100 may move in any direction.

In the illustrated embodiments, the power source 107 may produce an output torque at an output shaft 109. The output shaft 109 of the power source 107 may be connected to a generator 111. In operation, the output shaft 109 of the power source 107 rotates a rotor (not shown) of the generator 111 to produce electrical power to drive motors 112 associated with the drive wheels 108. The motors 112 may be connected via intermediate assemblies or directly to drive wheels 108 of the machine 100. A person skilled in the art will understand that the generator 111 may produce electric power in the form of alternating current (AC) power. This electrical power is supplied to a rectifier and converted to direct current (DC) power. The rectified DC power may be converted again to an AC power by an inverter circuit. The inverter circuit may be capable of selectively adjusting the frequency and/or pulse-width of its output, such that the motors 112 may be operated at variable speeds.

The machine 100 further includes the pantograph assembly 114 mounted on the machine 100. Alternatively, a pair of pantograph assemblies may be mounted side by side on the machine 100. The pantograph assembly 114 may be configured to supply electrical power from an overhead conductor 116 to the machine 100. The electrical power from the overhead conductor 116 may act as an auxiliary power source to assist in propulsion of the machine 100. During operation the pantograph assembly 114 may shortcut the power source 107 and the generator 111 thereby providing electrical power directly to the drive motors 112.

Figure 2:
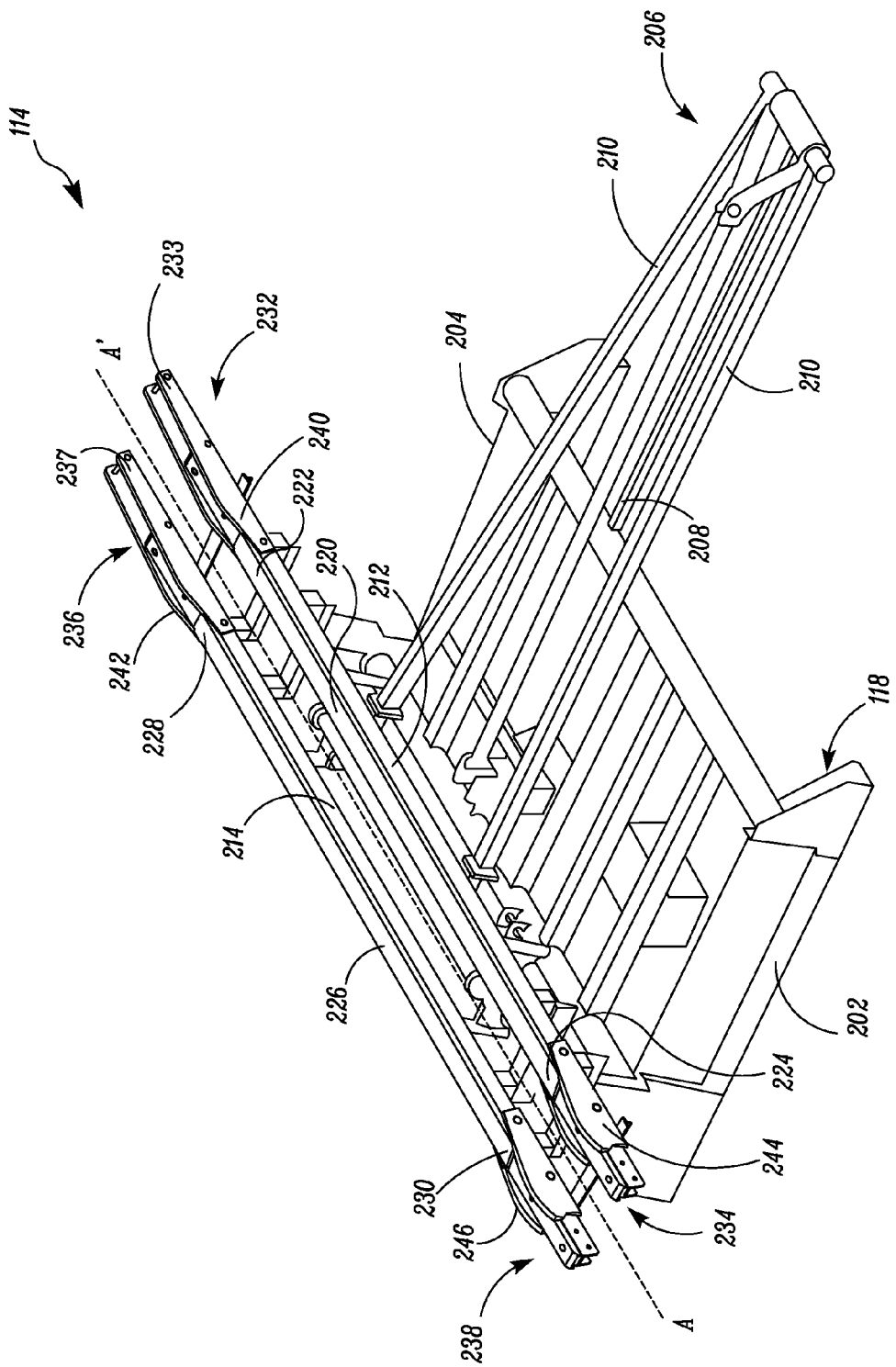
FIG. 2 is an isometric view of an pantograph assembly, according to an embodiment of the present disclosure.

Referring now to FIG. 2, the pantograph assembly 114 includes a pantograph support 118 having a pair of legs 202 and 204. The pair of legs 202 and 204 may be mounted on a front of the machine 100 for example by using nut and bolts. Insulating members (not shown) may be provided at the pair of legs 202 and 204. The insulting members may be designed to keep the pantograph support 118 electrically insulated from the machine 100.

An articulated assembly 206 may be connected to the pantograph support 118. The articulated assembly 206 includes a first link 208 hingedly connected to the pantograph support 118 and a second link 210 hingedly connected to the first link 208. The hinged connection of the first link 208 with the second link 210, enables tilting of the first link 208 with respect to the second link 210.

In an embodiment of the present disclosure, the first link 208 and the second link 210 may include a hydraulic or compressed air based piston-cylinder mechanism (not shown) to effect the tilting movement of the first link 208 with respect to the second link 210. Alternatively, a tie rod may connect one of the first link 208 and the second link 210, and may be configured to cause the tilting movement of the first link 208 with respect to the second link 210. The second link 210 may be connected to a pan rail 212 such that the pan rail 212 is supported on the second link 210 of the articulated assembly 206. In an alternative embodiment of the present disclosure, the second link 210 may be connected to a pair of pan rails, such as the pan rail 212 and an additional pan rail 214.

As shown in FIG. 2, the pan rails 212 and 214 extend along a longitudinal axis AA'. Auxiliary rails (not numbered) may span along the pan rails 212 and 214, to provide rigidity to the pan rails 212 and 214. Further, support brackets may be provided to interconnect the pan rails 212 and 214. In an embodiment, a carbon brush 220 may be supported by the pan rail 212, along the longitudinal axis AA'. The carbon brush 220 includes a first end portion 222 and a second end portion 224 opposite to the first end portion 222 along the longitudinal axis AA'. In an embodiment of the present disclosure, a pair of carbon brushes 220, 226 may be supported by the pair of pan rails 212, 214, respectively. The carbon brush 226 also includes a first end portion 228 and a second end portion 230.

Figure 3:
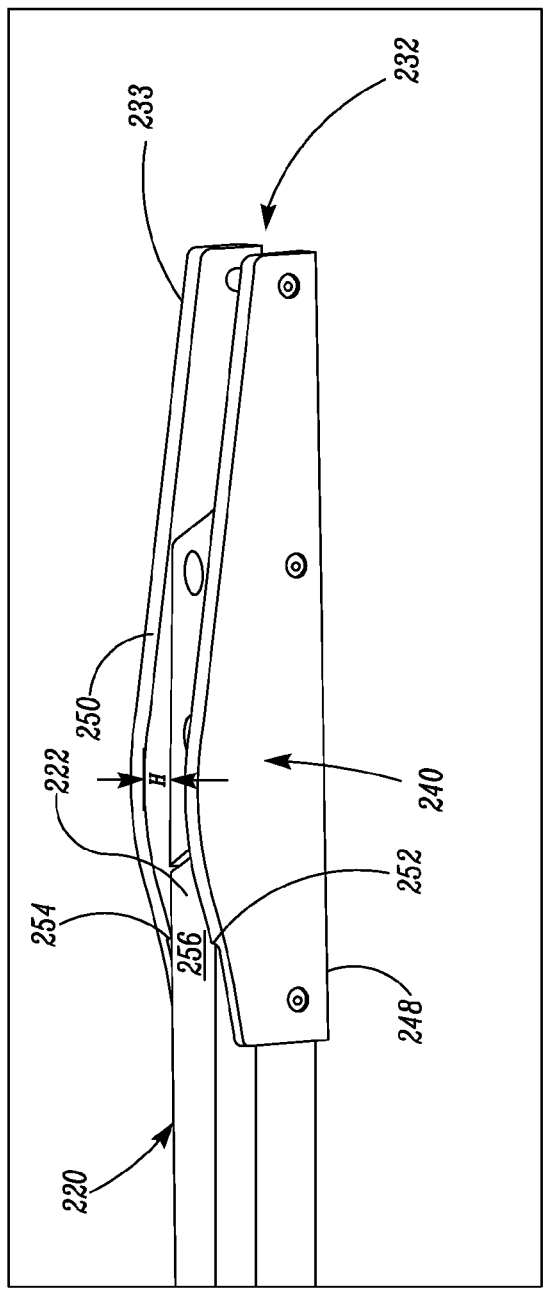
FIG. 3 is a view of end horns of the pantograph assembly of FIG. 2, according to an embodiment of the present disclosure.

As shown in FIGS. 2 and 3, the pantograph assembly 114 further includes an end horn 232 connected to the carbon brush 220. The end horn 232 may be composed of an electrically non-conducting material, such that the overhead conductor 116 may contact the end horn 232 and slide thereon before contacting the carbon brush 220. In the present disclosure, the pantograph assembly 114 also includes another end horn 236 connected to the carbon brush 226 at the first end portion 228. The end horns 232, 236 may be connected through a connecting link (not numbered). The end horns 232, 236 include bridge portions 240, 242, respectively. The bridge portions 240, 242, may be integral to the end horns 232, 236. Moreover, the end horns 232, 236, further include free end portions 233, 237 opposite to the bridge portions 240, 242, respectively.

Moreover, intermediate insulating members 234, 238 may be attached to the second end portions 224, 230 of the carbon brushes 220, 226, respectively, and adapted to connect with another pantograph assembly disposed adjacent to the pantograph assembly 114. The intermediate insulating members 234, 238 may also include bridge portions 244, 246. The overhead conductor 116 may contact the intermediate insulating members 234, 238 and the bridge portions 244, 246 and slide thereon before contacting the carbon brushes 220, 226 while shifting from the adjacent pantograph assembly to the pantograph assembly 114.

It will be apparent to a person skilled in the art that the end horns 232, 236 are structurally similar, and the present disclosure will be described with reference to only one end horn, the end horn 232. As illustrated in FIG. 3, the bridge portion 240 of the end horn 232 may include a first plate member 248 and a second plate member 250 opposite to the first plate member 248. The first plate member 248 and the second plate member 250 are configured to be engaged with the carbon brush 220. In an embodiment the first plate member 248 and the second plate member 250 have an arcuate profile. The first and the second plate member 248, 250 may include notched portion 252 and 254, receptively, configured to receive the first end portion 222 of the carbon brush 220. The notched portions 252 and 254 may abut a top surface 256 of the carbon brush 220 such that the arcuate profile of the first and the second plate members 248, 250 may be aligned with the top surface 256. In an embodiment, a maximum height H of the arcuate profile of the first and the second plate members 248, 250 may be in a range of about 1.0 to 1.5 inches relative to the top surface 256 of the carbon brush 220. The first and the second plate members 248, 250 may be attached with the pan rail 212 using rivets, screws, bolts or the like.

Moreover, the first and the second plate members 248, 250 may extend along the longitudinal axis to form the free end portion 233 of the end horn 232. The free end portion 233 of the end horn 232 is configured to receive the overhead conductor 116. Alternatively, the free end portion 233 of the end horn 232 may be made as a single solid piece, such that the first and the second plate members 248, 250 of the bridge portion 240 are protruding from the end horn 232.

Figure 4:
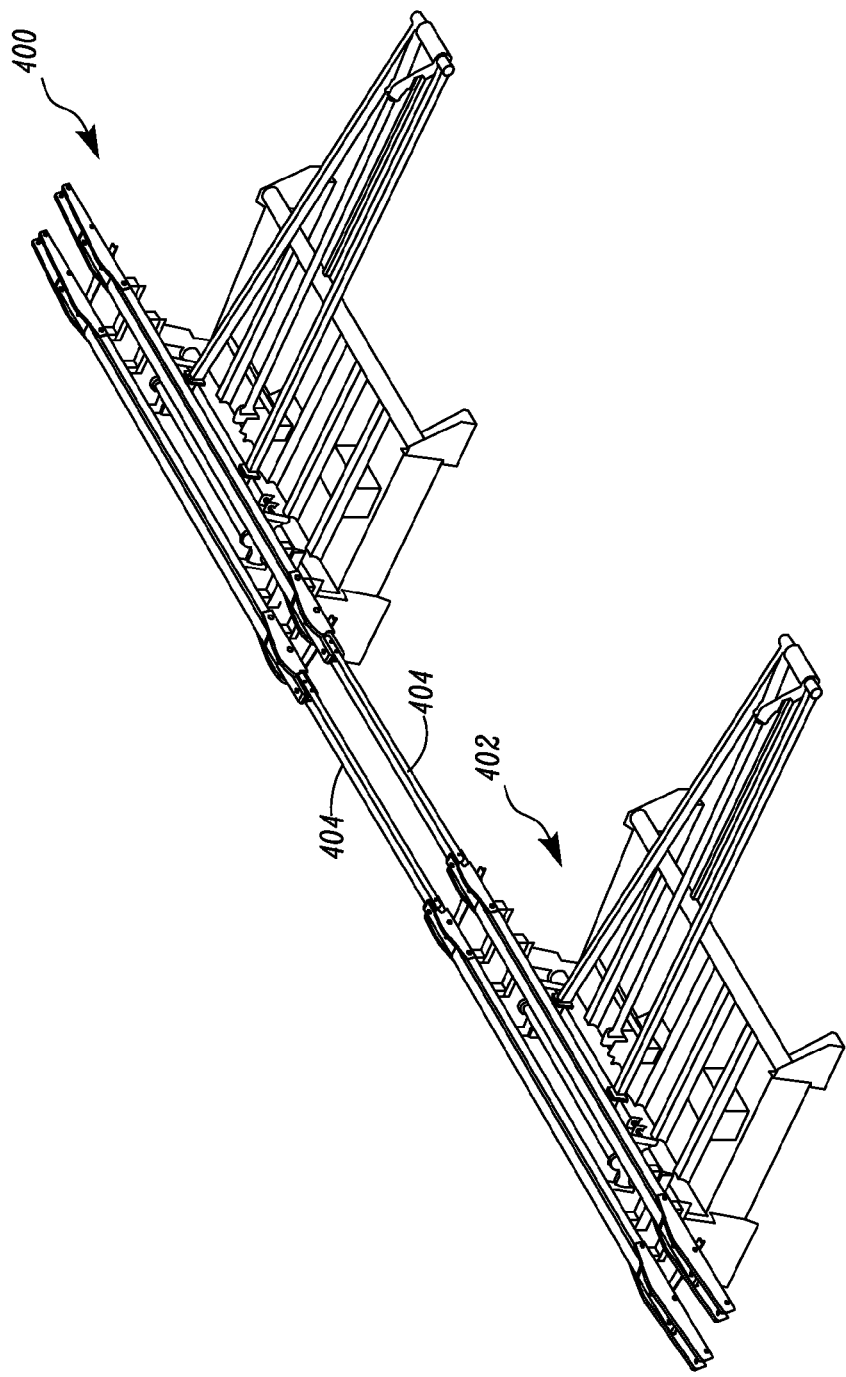
FIG. 4 illustrates two pantograph assemblies connected in series.

Moreover, the bridge portions 244, 246 associated with the intermediate insulating members 234, 238 may also include notched portions to receive the second end portions 224, 230 of the carbon brushes 220, 226. Referring now to FIG. 4, two pantograph assemblies 400, 402 are connected at the respective intermediate insulating members, such as the intermediate insulating members 234 and 238, via one or more linkage arms 404. The bridge portion, such as the bridge portions 244 and 246, are configured to allow the overhead conductor 116 to shift from a pantograph assembly to another by sliding over the linkage arms 404. The linkage arms 404 may be made of an electrically insulated material. It may be understood a person skilled in the art that two or more pantograph assemblies, such as the pantograph assembly 114, can be used in a series connection.

INDUSTRIAL APPLICABILITY

The machine 100 may operate in a predefined area such as an open pit mine, which may be provided with a plurality of parallel overhead conductors, such as the overhead conductor 116 positioned along a travel path. The overhead conductor 116 may come in electrical contact with the pantograph assembly 114 to provide electrical power to the machine 100. Particularly, the overhead conductor 116 may be in contact with the carbon brushes 220, 226. However, due to any lateral movement of the machine 100, the overhead conductor 116 may slide towards the end horns 232, 236 and move back towards the carbon brushes 220, 226. Conventionally, the transition of the overhead conductor 116 between the non-conducting end horns 232, 236 and the conducting carbon brushes 220, 226 may cause arcing. In an embodiment of the present disclosure, the bridge portions 240, 242 integrally formed with the end horns 232, 236 may preclude the arcing thereby saving the carbon brushes 220, 226 from getting damaged. This may also prolong service life of the carbon brushes 220, 226.

As described above, the bridge portions 240, 242 includes the first and the second plate members 248, 250 which substantially minimize a contact surface area between the overhead conductor 116 and the non-conducting bridge portions 240, 242 of the end horns 232, 236. Moreover, using the notched portions, such as notched portions 252 and 254, the bridge portions 240, 242 are aligned with the first end portions 222, 228 of the carbon brushes 220, 226 to allow a smooth transition of the overhead conductor 116 between the non-conducting end horns 232, 236 and the conducting carbon brushes 220, 226. Thus, any sudden change from a non-conducting surface of the end horns 232, 236 to the conducting surface of the carbon brushes 220, 226 and vice versa may be minimized to avoid any possible arcing while change or lateral movement of the overhead conductor 116.

In an aspect of the present disclosure, as the bridge portions 240, 242 may be integrally formed with the end horns 232, 236. Therefore, the need of employing any additional element to stop the arcing may be avoided. Thus, there is no additional weight on the pantograph assembly 114.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A pantograph assembly configured to transfer electrical power from an overhead conductor to a machine, the pantograph assembly comprising:
   a pantograph support detachably connected to the machine;
   an articulated assembly having a first link, and a second link hingedly connected to the first link, the first link being connected to the pantograph support;
   a pan rail supported by the second link of the articulated assembly;
   a carbon brush supported by the pan rail along a longitudinal axis of the pan rail, a contact surface of the carbon brush defining a longitudinal plane; and
   an end horn connected to the carbon brush, said end horn including:
   a bridge portion connected to the carbon brush and configured with an arcuate profile having a top surface that rises above the longitudinal plane of the contact surface, wherein the bridge portion includes a pair of vertical plate members that sandwich an end of the pan rail and the carbon brush between the vertical plate members.

2. The pantograph assembly of claim 1, wherein the bridge portion of the end horn is associated with an end portion of the carbon brush.

3. The pantograph assembly of claim 1, wherein the bridge portion includes a first plate member and a second plate member disposed opposite to the first plate member.

4. The pantograph assembly of claim 3, wherein the first plate member and the second plate member are configured to be engaged with the carbon brush.

5. The pantograph assembly of claim 4, wherein the first plate member and the second plate member include notched portions configured to receive an end portion of the carbon brush.

6. The pantograph assembly of claim 3, wherein the first plate member and the second plate member have an arctuate profile.

7. The pantograph assembly of claim 6, wherein the arcutate profile of the first plate member and the second plate member have a maximum height in a range of about 1.0 to 1.5 inches relative to a top surface of the carbon brush.

8. The pantograph assembly of claim 1, wherein the bridge portion is integral to the end horn.

9. The pantograph assembly of claim 1, wherein the bridge portion is composed of a non-conducting material.

10. A machine having a pantograph assembly configured to transfer electrical power from an overhead conductor to the machine for assisting propulsion of the machine, the pantograph assembly comprising:
    a pantograph support detachably connected to the machine;
    an articulated assembly having a first link, and a second link hingedly connected to the first link, the first link being connected to the pantograph support;
    a pan rail supported by the second link of the articulated assembly;
    a carbon brush supported by the pan rail and having a top contact surface defining a longitudinal plane; and
    an end horn being connected to the carbon brush, said end horn including:
    a bridge portion connected to the carbon brush and configured with an arcuate profile having a top surface that rises above the longitudinal plane, wherein the bridge portion includes a pair of vertical plate members that sandwich an end of the pan rail and the carbon brush between the vertical plate members.

11. The machine of claim 10, wherein the bridge portion of the end horn is associated with an end portion of the carbon brush.

12. The machine of claim 10, wherein the bridge portion includes a first plate member and a second plate member disposed opposite to the first plate member.

13. The machine of claim 12, wherein the first plate member and the second plate member are configured to be engaged with the carbon brush.

14. The machine of claim 13, wherein the first plate member and the second plate member include notched portions configured to receive an end portion of the carbon brush.

15. The machine of claim 12, wherein the first plate member and the second plate member have an arctuate a profile.

16. The machine of claim 15, wherein the arctuate profile of the first plate member and the second plate member have a maximum height in a range of about 1.0 to 1.5 inches relative to a top surface of the carbon brush.

17. The machine of claim 10, wherein the bridge portion is integral to the end horn.

18. The machine of claim 10, wherein the bridge portion is composed of a non-conducting material.

19. A pantograph assembly configured to transfer electrical power from an overhead conductor to a machine, the pantograph assembly comprising:
    a pantograph support detachably connected to the machine;
    an articulated assembly having a first link, and a second link hingedly connected to the first link, the first link being connected to the pantograph support;
    a pan rail supported by the second link of the articulated assembly;
    a carbon brush supported by the pan rail and having a top contact surface defining a longitudinal plane; and
    an end horn having a first plate member and a second plate member disposed opposite first plate member that sandwich an end of the pan rail and form a bridge portion, the bridge portion configured with an arcuate shape that rises above the longitudinal plane, wherein the arctuate shape of the bridge portion configured to transfer the overhead conductor between the end horn and the carbon brush.

20. The pantograph assembly of claim 19, wherein the bridge portion is integral to the first plate member and the second plate member.

* * * * *